United States Patent
Alonso Sadaba et al.

(10) Patent No.: US 9,716,384 B2
(45) Date of Patent: Jul. 25, 2017

(54) SYSTEM AND METHOD FOR CONTROLLING A WIND FARM

(75) Inventors: Oscar Alonso Sadaba, Navarra (ES); Teresa Arlaban Gabeiras, Navarra (ES); Ricardo Royo Garcia, Navarra (ES); Miguel Nuñez Polo, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 1702 days.

(21) Appl. No.: 12/863,472

(22) PCT Filed: Jan. 19, 2009

(86) PCT No.: PCT/ES2009/000023
§ 371 (c)(1),
(2), (4) Date: Aug. 12, 2010

(87) PCT Pub. No.: WO2009/092834
PCT Pub. Date: Jul. 30, 2009

(65) Prior Publication Data
US 2010/0298991 A1    Nov. 25, 2010

(30) Foreign Application Priority Data
Jan. 22, 2008   (ES) .................................. 200800142

(51) Int. Cl.
*G05D 3/12*    (2006.01)
*G05D 5/00*    (2006.01)
(Continued)

(52) U.S. Cl.
CPC .............. *H02J 3/386* (2013.01); *F03D 7/028* (2013.01); *F03D 7/0272* (2013.01); *F03D 7/048* (2013.01);
(Continued)

(58) Field of Classification Search
CPC ...................................................... H02J 3/386
(Continued)

(56) References Cited

U.S. PATENT DOCUMENTS 6,924,565 B2    8/2005  Wilkins et al. .................. 290/44
7,983,799 B2 *  7/2011  Bose et al. ..................... 700/297
(Continued)

FOREIGN PATENT DOCUMENTS

| EP | 1 467 463 A1 | 10/2004 | ............... H02J 3/38 |
| EP | 1 508 951 A1 | 2/2005 | ............... H02J 3/18 |
| EP | 1 512 869 A1 | 3/2005 | ............... F03D 9/00 |

OTHER PUBLICATIONS

Tapia, A., et al, "Reactive Power Control of a Wind Farm made up with Doubly Fed Induction Generators (I)", *Power Tech Proceedings*, 2001 IEEE, Porto, Portugal, Sep. 10-13, 2001.
Tapia, A., et al, "Reactive Power Control of a Wind Farm made up with Doubly Fed Induction Generators (II)", *Power Tech Proceedings*, 2001 IEEE Porto, Portugal, Sep. 10-13, 2001 vol. 4, pp. 5, vol. 4, 2001.

*Primary Examiner* — Kimberly Wilson
(74) *Attorney, Agent, or Firm* — Polsinelli PC

(57) ABSTRACT

System and method for controlling a wind farm, for wind farms comprising a plurality of wind turbines having a rotor, a generator, a control unit and connections to the mains of the wind farm, the wind turbines generating reactive power according to the instructions of the wind farm control system, the control system calculating a global reactive power demand to be produced by the whole wind farm on the basis of the voltage at the connection point or the power factor required, and the control system sending reactive power instructions to the wind turbines of the farm, the control system receiving information based on one or more parameters indicating the level of heating of the electrical components of the wind turbines, the generation of reactive power being distributed between the various wind turbines.

8 Claims, 6 Drawing Sheets

(51) Int. Cl.
*G05D 9/00* (2006.01)
*G05D 11/00* (2006.01)
*G05D 17/00* (2006.01)
*H02J 3/38* (2006.01)
*F03D 7/02* (2006.01)
*F03D 7/04* (2006.01)
*H02J 3/18* (2006.01)
*H02P 9/00* (2006.01)
*H02P 101/15* (2016.01)

(52) U.S. Cl.
CPC .............. *H02J 3/1892* (2013.01); *H02P 9/00* (2013.01); *H02P 2101/15* (2015.01); *Y02E 10/723* (2013.01); *Y02E 10/763* (2013.01)

(58) Field of Classification Search
USPC ........................................................ 700/287
See application file for complete search history.

(56) References Cited

U.S. PATENT DOCUMENTS

| | | |
|---|---|---|
| 2002/0029097 A1 | 3/2002 | Pionzio, Jr. et al. ......... 700/286 |
| 2002/0087234 A1* | 7/2002 | Lof et al. ...................... 700/286 |
| 2005/0040655 A1* | 2/2005 | Wilkins et al. ................. 290/44 |
| 2006/0273595 A1* | 12/2006 | Avagliano et al. ............. 290/44 |
| 2007/0073445 A1* | 3/2007 | Llorente Gonzalez et al. .............................. 700/286 |
| 2008/0106098 A1* | 5/2008 | Miller et al. .................... 290/44 |
| 2008/0106099 A1* | 5/2008 | Ichinose et al. ................ 290/44 |
| 2008/0150283 A1 | 6/2008 | Rivas et al. .................... 290/44 |
| 2009/0160187 A1* | 6/2009 | Scholte-Wassink ........... 290/44 |
| 2011/0204630 A1* | 8/2011 | Arinaga et al. ................ 290/44 |

\* cited by examiner

SYSTEM AND METHOD FOR CONTROLLING A WIND FARM

CROSS REFERENCE TO RELATED APPLICATIONS

The present application is a 35 U.S.C. §371 National Phase conversion of PCT/ES2009/000023, filed Jan. 19, 2009, which claims benefit of Spanish Application No. 200800142, filed Jan. 22, 2008, the disclosure of which is incorporated herein by reference. The PCT International Application was published in the Spanish language.

OBJECT OF THE INVENTION

As stated in the title of the present description, the following invention relates to a system and method for controlling a wind farm, being of the type of wind farm made up of an array of wind turbines, in such a way that the proposed control system distributes the reactive power production such that it is possible to effect a distribution of the active power limitation among the different wind turbines taking into account the thermal state of the components of each wind turbine when it comes to sending the individual instructions to each of them.

TECHNICAL FIELD OF THE INVENTION

The present description discloses a system and method for controlling a wind farm, which permits the coordinated operation of each of the wind turbines it comprises, in such a way that globally the electrical network requisites are met and individually an optimum functioning of each wind turbine is achieved from the thermal point of view.

BACKGROUND OF THE INVENTION

The control of active and reactive power at the wind farm level in response to frequency and voltage or power factor controls is a well known and widely studied topic.

On the one hand, with the aim of modifying the voltage in the connection point, the central control system emits the necessary reactive power instructions for each wind turbine, while a possible individual control of each wind turbine, like that described in patent application EP1512869A1, is responsible for making sure that the limits permitted in each of them are not exceeded.

On the other hand, in order to collaborate in limiting the frequency of the electrical network to within a certain range, a control is carried out over the active power generated, from which derive the individual instructions for each wind turbine. An example of this type of control is that of patent application EP1467463A1.

The reactive power control has typically been carried out based on the desired power factor and, taking into account the active power generated, calculating the necessary global reactive power and sending the power factor instructions to each wind turbine.

As cited in U.S. Pat. No. 6,924,565, the drawback of such control lies in the fact that the total capacity of each wind turbine fails to be exploited. That patent proposes alternative methods for the generation of reactive power having the aim of exploiting the entire said capacity based on the level of active power generated at each moment.

DESCRIPTION OF THE INVENTION

The aforementioned systems nevertheless present the drawback that the central control system does not consider the thermal state of the electrical components of each wind turbine when creating the individual instructions for reactive power, such that these instructions might not be optimum for the individual functioning of each machine. With the aim of overcoming this drawback, the present specification describes a system and method for controlling reactive power by means of which individual instructions for reactive power are created for each wind turbine making up the farm with the aim of guaranteeing that the demands of the electrical network are met, taking into account the thermal state of the electrical components of each wind turbine.

Generally, the need of reactive power generation derived from the voltage or power factor controls does not in general have to correspond to the maximum generation capacity of the wind farm. Therefore, there exists a degree of freedom when it comes to sending the individual instructions for reactive power to each wind turbine, such that, depending on their thermal state, they generate more or less of it, though at all times guaranteeing that the requisites of the network are met at the global level.

The present invention claims a system and method for controlling a wind farm which exploits that degree of freedom and is capable of optimizing the functioning from the thermal point of view of the electrical components of all the wind turbines making up the farm, with the aim of extending their lifetime.

The control system of the invention is applied to a wind farm composed of several wind turbines, of the type that contains a rotor, a generator, a control unit and means of connection to the farm network. Said wind turbines are endowed with means for generating reactive power following the control system instructions of the wind farm. The control system of the wind farm comprises a global instruction calculation module which calculates a global demand for reactive power to be produced by the entire farm on the basis of the voltage in the connection point or the power factor that is demanded. The control system of the present invention further comprises a distribution module which receives that global reactive power instruction and also receives information from the wind turbines based on one or more parameters indicating the level of heating of the electrical components of the wind turbine. On the basis of that information the distribution module calculates some reactive power generation instructions for the different wind turbines which reduce the temperature in the electrical components of those wind turbines displaying greater heating, satisfying the global demand for reactive power for the whole farm.

In this way, the individual demand for reactive power will be such that permits those wind turbines containing a component displaying a temperature that is closest to its corresponding limit to be able to reduce their temperature, while those that are less thermally stressed compensate for the remaining reactive power, always provided that their capacities are not exceeded and with the aim of providing the electric network with the appropriate reactive level at each moment. In this way, the lifetime of the different electrical components is extended.

According to another aspect of the invention, account is taken of certain thermal indices representing the temperature of, among other components that are thermally affected by the production of reactive power, the component that is closest to its temperature limit and the class of its hottest component, taking into account the effect which the production of inductive reactive power has on the heating of that component. The production of reactive power is distributed in such a way that minimizes electrical losses in the hottest component of the wind turbines displaying a higher heating index.

The control system of the present invention adjusts the rule of distribution of reactive power production as a function of the error existing in the reactive level demanded of the entire farm and the real reactive power produced by it, and, moreover, said system also takes account of the capacity for reactive power generation by the converter of the wind turbines that are switched off.

Moreover, the requirements being made of non-manageable sources of energy with regard to their participating in the stability maintenance tasks of the electrical network are increasing and among them is to be found that of implementing active power controls in response to variations in frequency.

In the event of the frequency undergoing an increase above its rated value, the wind turbine has to limit the power it produces by a defined percentage depending on the deviation in the frequency.

Generally, this power reduction is usually brief and does not offer any major opportunities for temperature reduction in the wind turbines. Nevertheless, it is possible that wind turbines might in the future also be requested for a reserve of active power continually, in such a way that said reserve can be used with regard to events involving a drop in frequency requiring an increase in the power of the wind power as a whole. This constant reserve of power in the stationary state does indeed permit decisions to be taken regarding which of the wind turbines have most power in reserve, and therefore suffer less from heating of their electrical components.

By virtue of all this, a further object of the invention is to provide a control system for a wind farm that is capable of distributing the active power limitation instructions in a way that is suited to the aim of optimizing the thermal behavior of the electrical components of all the wind turbines making up the farm, reducing the average temperature of all them and therefore extending their lifetime.

The present invention describes a control system for a wind farm comprised of wind turbines capable of limiting the active power following the instructions of the farm's control system. Said system comprises a distribution module which, on the basis of the information on the level of heating of each wind turbine, establishes the active power limitation instructions for the different wind turbines which reduce the temperature in the electrical components of those wind turbines displaying greater heating, satisfying the demand for active power limitation for the whole farm. In one possible embodiment the control system further comprises a global instruction calculation module in which the global instruction for active power limitation is calculated starting from the frequency of the electrical network.

In order to carry out the distribution of the active power limitation instructions, the control system of the present invention receives parameters from the wind turbines indicating the level of heating of the electrical components, and at least one of them provides information on the temperature of the component that is closest to its thermal limit among the components whose temperature is affected by the active power limitation.

Moreover, given that the electrical components have an optimum range of functioning temperatures, in sites with low temperatures the electrical components can sometimes reach the point of working at temperatures that are below optimum. In those cases, the instructions for reactive power and/or active power limitation can be used to increase the temperature of those wind turbines with a lower level of heating.

So, some electrical components have greater losses and therefore a higher temperature, the greater the production of reactive power, whether this is capacitive or inductive. An example of this is the electrical generator in a wind turbine of the doubly fed type. In these cases the reactive power instructions can be such that some generators produce capacitive reactive power and others inductive, with a reactive power being generated circulating within the wind farm which raises the temperature of all of them, and at the same time the net production is such that the global demand for reactive power is satisfied.

By virtue of all this, another object of the invention is to provide a control system which heats the different electrical components, bringing their temperature within the optimum range of temperatures. Said system is applied to a wind farm, of the type of farm consisting of an array wind turbines comprising a rotor, a generator, a control unit and means of connection to the wind farm network, said wind turbines being endowed with means for generating reactive power following the instructions of the control system of the wind farm. According to this object of the invention, the control system comprises a global instruction calculation module which calculates a global demand for reactive power to be produced by the entire wind farm on the basis of the voltage in the connection point or the power factor, and a distribution module which receives that global reactive power instruction and also receives information from the wind turbines based on one or more parameters indicating the level of heating of the electrical components of the wind turbine. On the basis of that information it calculates some reactive power generation instructions for the different wind turbines which increase the temperature in the electrical components of those wind turbines displaying lesser heating, satisfying the global demand for reactive power for the whole wind farm.

In one embodiment of the invention said distribution is carried out in such a way that some reactive power generation instructions are inductive and other are capacitive.

The present invention also describes a control method of the reactive power generated by a wind farm which, according to the invention, comprises the following steps:
calculating a global demand for reactive power to be produced by the entire wind farm on the basis of the voltage at the connection point or the power factor,
receiving one or several parameters from each wind turbine indicating the level of heating of the components it comprises;
calculating, from the desired reference global value and the values of the thermal parameters received, the reactive power production instructions for the different wind turbines which reduce the temperature in the electrical components for those wind turbines displaying greater heating, satisfying the global demand for reactive power and;
sending the individual instructions to each wind turbine.

Said method of control is also characterized in that:
at least one of the parameters indicating the level of heating of the wind turbines is a representative index of the temperature of the component that is closest to its temperature limit from among the components that are affected by the generation of reactive power and
at least one other of the parameters reports on the class of that component, taking into account the effect that the production of inductive reactive power has on the heating of that component, and;

in that the production of reactive power is distributed in such a way that minimizes electrical losses in the hottest component of the wind turbines displaying a greater heating index.

In another aspect of the invention said method further comprises the following steps:

obtaining the reactive power generated by the wind farm at each moment on the basis of the measurements made or data provided by each of the wind turbines making up the farm;

comparing the reactive power generated with the reactive power demanded and, adjusting the distribution of reactive power on the basis of the error existing between the level of reactive power that is demanded and that produced.

In one embodiment of the invention the distribution of reactive power takes into account the capacity for generation of reactive power by the converter of the wind turbines that are switched off.

Another aspect of the invention consists of the control of the active power generated by a wind farm, comprising the following steps:

obtaining a demand for active power limitation for the entire wind farm;

calculating, on the basis of the reference value for global active power limitation and of the values of the thermal parameters that are received, certain individual instructions for active power limitation for each wind turbine which reduce the temperature in the electrical components of those wind turbines displaying greater heating, satisfying the global limitation on active power that is demanded; and, sending the individual instructions to each wind turbine.

In one embodiment the active power limitation instruction for the entire farm is calculated on the basis of the electrical network frequency.

At least one of the parameters indicating the level of heating of the electrical components of the wind turbines is an index (tx) representing the temperature of the component that is closest to its temperature limit from among the components that are thermally affected by the production of active power. The active power limitation is distributed in such a way that minimizes electrical losses in the hottest component of the wind turbines displaying a greater heating index.

Another object of the invention provides a method for heating the components, bringing their temperature within the optimum range of temperatures. Said control method is applied to a wind farm, of the type of wind farm comprising of an array wind turbines comprising a rotor, a generator, a control unit and means of connection to the farm network, said wind turbines being endowed with means for generating reactive power following the instructions of the control system of the wind farm. Said method comprises the step of calculating a global demand for reactive power to be produced by the entire wind farm on the basis of the voltage at the connection point or the power factor, and is characterized in that it also comprises the following steps:

receiving one or several parameters from each wind turbine indicating the level of heating of the components it comprises;

calculating, from the desired reference global value and the value of the thermal parameters received, the reactive power production instructions for the different wind turbines which increase the temperature in the electrical components for those wind turbines displaying lesser heating, satisfying the global demand for reactive power and;

sending the individual instructions to each wind turbine.

In one embodiment of the invention said distribution is carried out in such a way that some reactive power generation instructions are inductive and other are capacitive.

In order to complement the description that is going to be made forthwith, and with the aim of aiding a better understanding of the characteristics of this invention, this descriptive specification is accompanied by a set of drawings comprising figures in which, on an illustrative rather than limiting basis, the most characteristic details of the invention have been represented.

DESCRIPTION OF AN EMBODIMENT OF THE INVENTION

Figure 1:
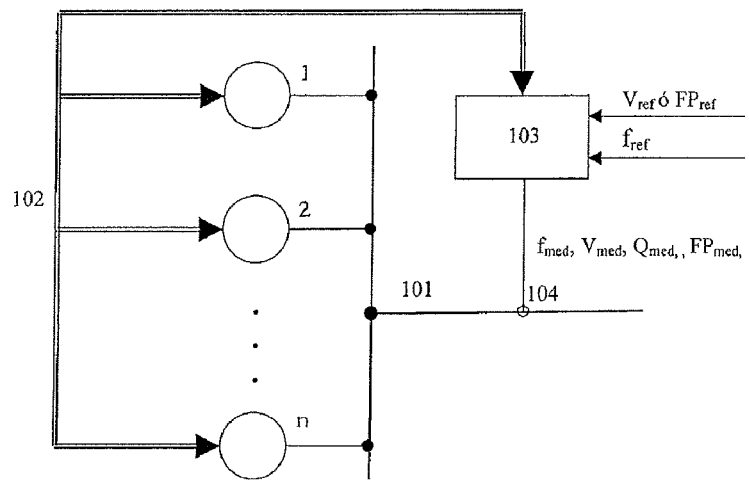
FIG. 1. Shows a general arrangement of a wind farm endowed with a conventional control system.

With the commented figures in view and in accordance with the adopted numbering we can see how FIG. 1 represents a general arrangement of a wind farm endowed with an array of wind turbines 1 to n, which discharge electricity into an electrical network 101, said wind farm being endowed with a communication network 102 for the farm and a control system 103 capable of receiving information on said wind turbines and of sending them instructions.

In a preferred embodiment, at a point 104 the said control system measures the voltage and frequency, active power and reactive power generated, and it receives instructions on frequency and power factor or voltage.

Figure 2:
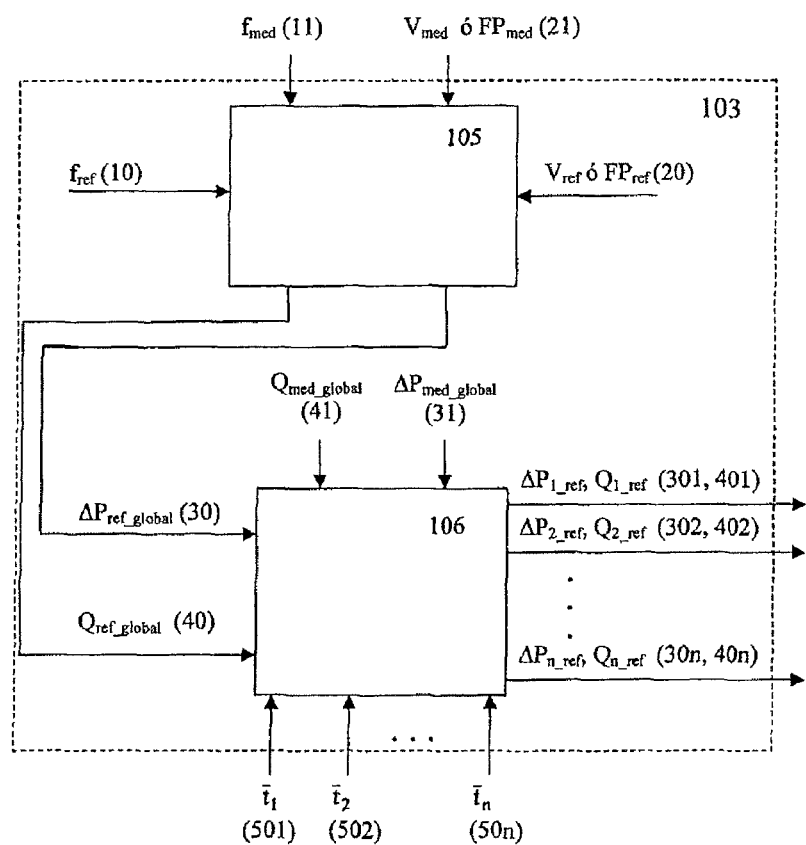
FIG. 2. Shows a general arrangement of a preferred embodiment of the control system forming the object of the present invention.

FIG. 2 of the drawings shows a diagram of a preferred embodiment of the control system of the present invention, such that said control system 103 calculates the individual instructions for reactive power generation and active power limitation for each of the wind turbines making up the farm and it does so in two stages.

In a first stage 105, on the one hand, it calculates the global reference for active power reduction 30 as a function of the deviation of the frequency measured in the electrical network 11 with respect to the reference value 10 and, on the other hand, it calculates the global reference for reactive power 40 for the entire farm as a function of the voltage or power factor measurements 21 and their respective reference value 20.

In a second stage 106, said global references on active power limitation and reactive power generation are converted into individual instructions for each wind turbine (301, ..., 30*n*; 401, ..., 40*n*) as a function of the thermal state of their electrical components.

To achieve this, each wind turbine sends to the control system parameters indicating the state of heating of its electrical components (501, ..., 50*n*), at least one of which reports on the temperature of the component that is closest to its limit temperature and at least one other reports on the type of component it concerns.

In this way, the load of reactive power generation and of active power limitation that is demanded will be appropriate for reducing the temperature in those components displaying greater heating.

Figure 3:
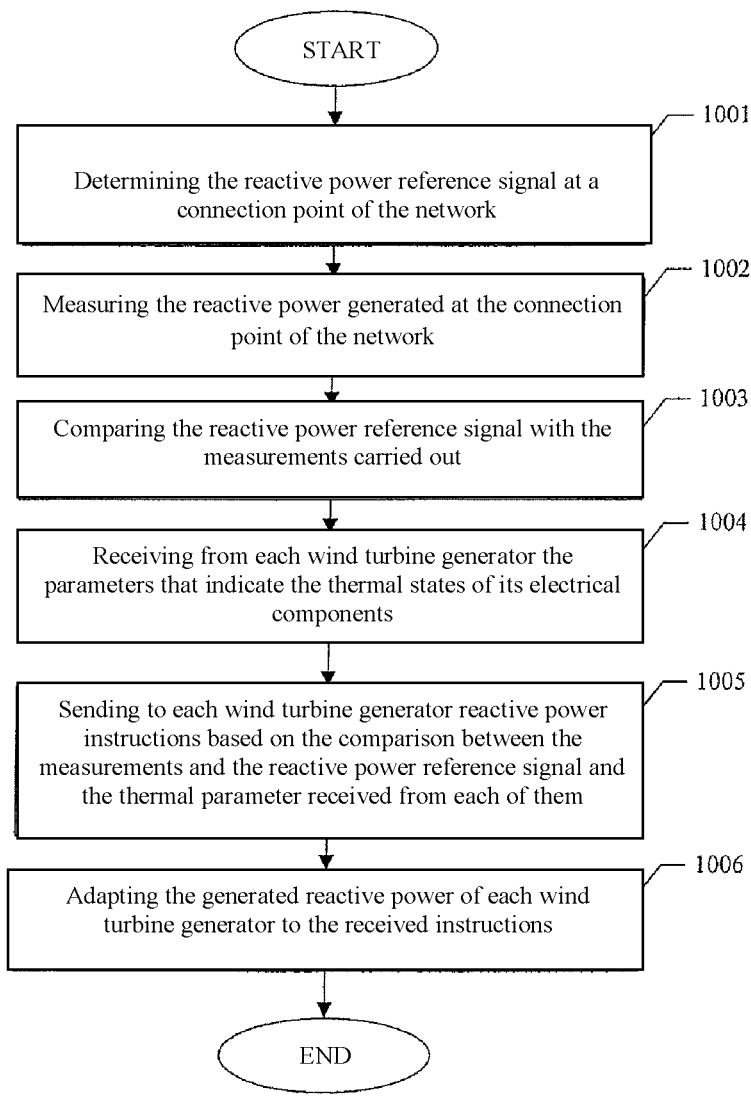
FIG. 3. Shows a flow diagram of a preferred embodiment of the method for controlling reactive power forming the object of the present invention.

FIG. 3 of the drawings shows the flow diagram of a preferred embodiment of the method for controlling the reactive power according to the present invention, in such a way that in a first step 1001 the reactive power reference signals for the wind farm as a whole are determined on the basis of the voltage or power factor controls, and then measurements are taken of the real reactive power generated by the array of wind turbines 1002 and this is compared with the reference signal 1003.

Moreover, each wind turbine sends parameters indicating the thermal state of its electrical components 1004. In this way, depending on the comparison between the reference signal and the measurements made, and on the thermal parameters received from the wind turbines, a decision is taken on the individual instructions for reactive power generation for each of the wind turbines 1005 and these instructions are sent. Each of the wind turbines will adapt its output to the instructions received in order to guarantee compliance at the farm level with the voltage or power factor references 1006.

Figure 4:
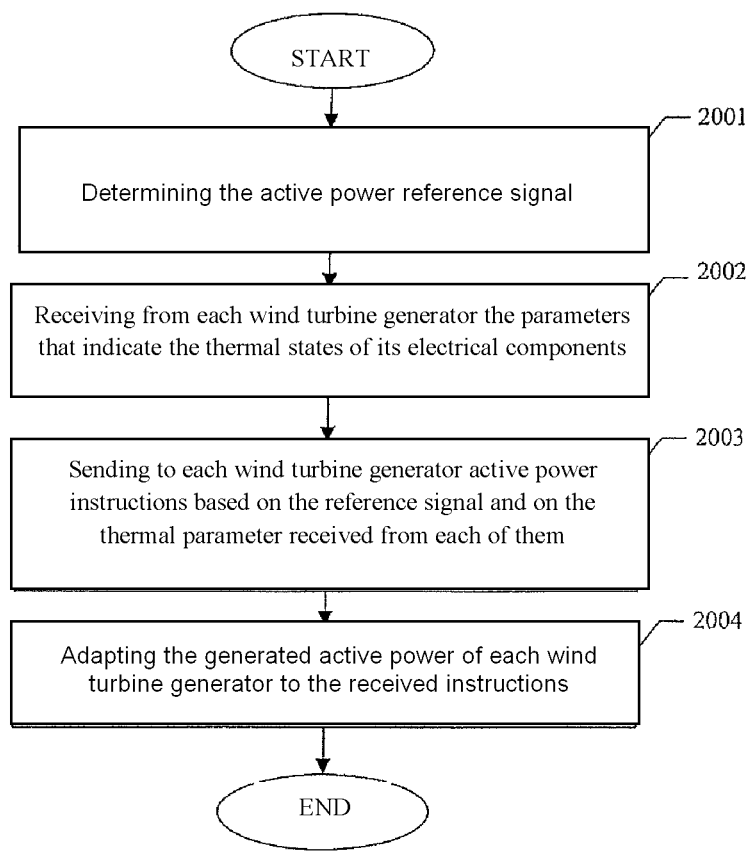
FIG. 4. Shows a flow diagram of a preferred embodiment of the method for controlling active power forming the object of the present invention.

FIG. 4 of the drawings shows the flow diagram of a preferred embodiment of the method for controlling the present invention, in such a way that in a first step 2001 the active power reference signals are determined for the wind farm as a whole based on the electrical network frequency, and, on the other hand, each wind turbine sends parameters indicating the thermal state of its electrical components 2002.

In this way, depending on the reference signal and the thermal parameters received from the wind turbines a decision is taken on the individual instructions for active power limitation 2003 and these are sent. Each of the wind turbines will adapt its output to the instructions received to guarantee compliance with the active power limitation at the farm level 2004.

Figure 5:
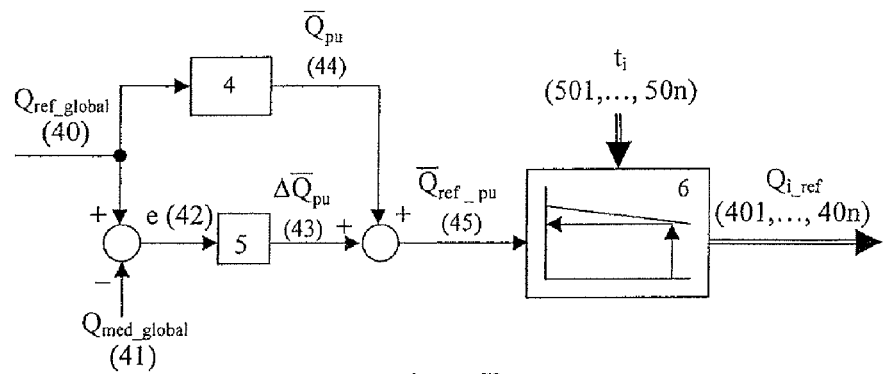
FIG. 5. Shows a block diagram of the monitoring control of the reference.

FIG. 5 of the designs shows the block diagram of the monitoring control of the reactive power generation reference of a preferred embodiment, which consists of two branches with different response dynamics.

In one of them, the block 4 obtains the mean contribution of reactive power per unit 44 which each of the wind turbines with present capacity for generating reactive power has to make, on the basis of the global reference for reactive power 40 and data on the operating state of the wind turbines. This is the faster dynamic branch since it is used for dealing with sudden changes in the reference requiring agility of action.

The function of the other branch is to correct minor errors that might result from limitations in any of the wind turbines that were not taken into account at the time of carrying out the distribution from the central control system for the wind farm. Said corrections do not require any excessive speed in response, and so the dynamic of this branch of the block diagram is slower. A PI type controller 5 establishes a variation for the mean reactive power reference per unit 43 with the aim of eliminating the error that might exist between the reference and the quantity of real reactive power 42 at the outlet from the farm. The sum of the signals coming from each of the branches provides the mean reactive power reference per unit 45.

With this data and depending on the thermal parameters received from each of the wind turbines, a distribution function 6 gives as the result the individual reactive power reference for each of the machines 401, ..., 40*n*.

In order to carry out the distribution of the instructions, the central control system of the present invention receives parameters from the wind turbines indicating the level of heating of the electrical components, at least one of which provides information on the value of the temperature and its proximity to the operating limit of the component displaying greater heating. In a preferred embodiment said parameter is a normalized index calculated as follows:

$$t_x = \frac{T_{compx} - T_{amb}}{T_{max} - T_{amb}}$$

Where Tcomp is the temperature of component "x" (measured or estimated), Tamb is the ambient temperature and $T_{max}$ is the maximum operating temperature of that component.

In a preferred embodiment, in which the wind turbines making up the farm are doubly fed asynchronous generators, at least one other parameter reports on the type of component displaying a greater thermal index tx, with the latter depending on the effect which the inductive reactive power has on the heating of those components.

Figure 7:
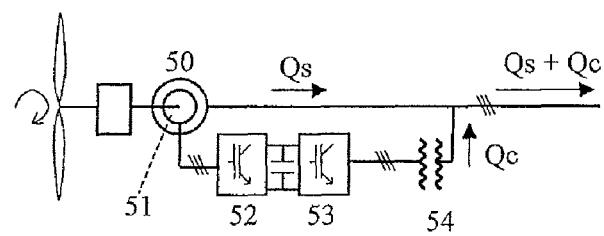
FIG. 7. Shows the arrangement of a doubly fed asynchronous wind turbine.

FIG. 7 shows the arrangement of a doubly fed asynchronous generator. In this type of wind turbine the capacitive type reactive power generation raises the temperature of all the electrical components involved in it.

On the other hand, the inductive reactive power has different effects depending on the type of component. The converter on the machine side 52 is responsible for providing the rotor 51 with the necessary magnetization current. This decreases when the reactive power that is ordered is of the inductive type and therefore losses in the copper both of the converter on the wind turbine side and of the rotor also decrease.

Nevertheless, in any other component the inductive type reactive power increases the electrical losses. Therefore, in a preferred embodiment, given a global reference for inductive type reactive power, those wind turbines in which the component with the highest temperature is either the rotor or the converter on the wind turbine side are required to supply the entire reactive power capacity which they have available, since in this way their temperature will fall, while on the other hand the rest of the wind turbines, whose hottest components will be harmed by any kind of reactive power, are released from making such supplies.

Figure 6:
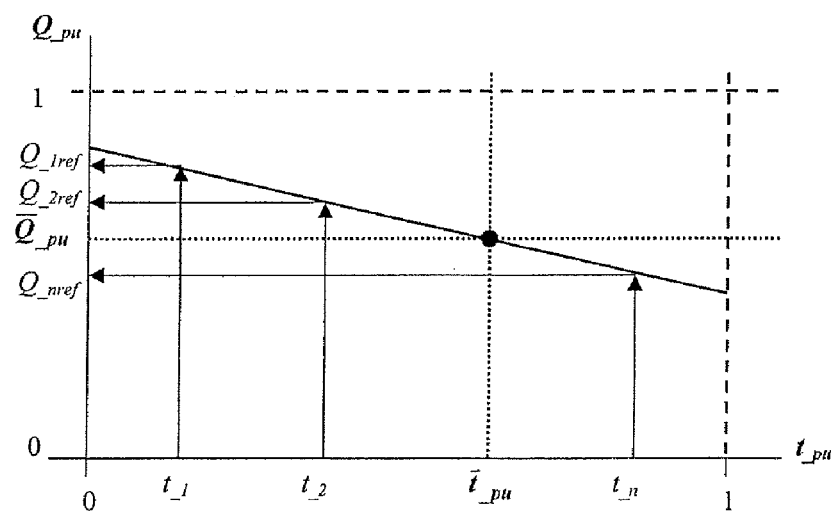
FIG. 6. Shows a distribution curve of the reactive power reference as a function of the thermal state of each wind turbine of a preferred embodiment.

In a preferred embodiment the distribution function or the reactive power distribution is a function as it is shown in FIG. 6. This is constructed on the basis of the value per average unit of reference reactive power $\overline{Q}_{\_pu}$ and of the average thermal index of heating $\overline{t}_{\_pu}$. This function permits the amount of reactive power per unit to be obtained which each wind turbine has to supply ($Q_{\_1ref}$, $Q_{\_2ref}$ ... $Q_{\_nref}$), using the thermal index of the appropriate component ($t_{\_1}$, $t_{\_2}$ ... $t_{\_n}$) in order to achieve the monitoring of the reference at the global level and an optimum functioning of the wind turbines making up the wind farm.

In another preferred embodiment, especially suitable for low temperature sites, the instructions for reactive power (301, . . . 30n) and/or for active power limitation (401, . . . 40n) are used to increase the temperature of those wind turbines with a lower level of heating, thereby bringing their electrical components into the optimum temperature range. According to this embodiment, a distribution module (106) receives said global demand for reactive power and also receives information from the wind turbines (1, . . . . n) based on one or several parameters indicating the level of heating of the electrical components (501, . . . 50n) of the wind turbines, calculating on the basis of that information certain instructions for reactive power generation (401, . . . 40n) for the different wind turbines (1, . . . . n) which increase the temperature in the electrical components of those wind turbines displaying less heating, satisfying the global demand for reactive power (40) for the entire farm. A global instructions calculation module (105) calculates the said global demand for reactive power (40) to be produced by the entire farm on the basis of the voltage in the connection point or the power factor (21).

In a preferred embodiment the reactive power instructions (301, . . . 30n) are such that some wind turbines produce capacitive reactive power and others inductive, generating a reactive power circulating within the wind farm which raises the temperature of all of them, and at the same time the net production is such that the global demand for reactive power is satisfied.

What is claimed is:

1. Control method of a wind farm, the wind farm comprises an array of wind turbines, each wind turbine of said array of wind turbines comprising a rotor, a generator, a control unit and means of connection to the wind farm, said wind turbines being endowed with means for generating reactive power following instructions of a control system of the wind farm, said method comprising the step of calculating a global demand for reactive power to be produced by the entire farm on the basis of a voltage at a connection point or a power factor, wherein said method further comprises the following steps:
    receiving one or several thermal parameters from each wind turbine providing information on values of temperatures of electrical components included in each wind turbine;
    calculating, on the basis of the global demand for reactive power and of the values of the thermal parameters received, the instructions for reactive power production for the different wind turbines which reduce the values of the temperatures of the electrical components of those wind turbines displaying greater heating, the instructions for reactive power production collectively satisfying the global demand for reactive power and;
    sending said instructions to each wind turbine,
    wherein the thermal parameters providing information on the values of the temperatures of the electrical components included in each wind turbine comprise at least:
    a first thermal parameter comprising a heating index, calculated in accordance with at least the following steps:
        selecting the electrical components that are thermally affected by the reactive power production;
        selecting from among the electrical components a hottest electrical component the temperature of which has a value closest to a temperature limit of the hottest electrical component; and,
        calculating for the selected electrical component a heating index representing the proximity of an operating temperature of the hottest electrical component to a temperature limit of the hottest electrical component;
    a second thermal parameter calculated for the hottest electrical component indicating the effect which a production of inductive reactive power has on a temperature of the hottest electrical component;
    wherein the reactive power production is distributed according to a method comprising the following steps:
    selecting the wind turbine with a greatest heating index;
    modifying the reactive power instructions corresponding to the wind turbine with the greatest heating index on the basis of the second thermal parameter in order to reduce electrical losses in a hottest electrical component of the wind turbine with the greatest heating index.

2. Control method of a wind farm, according to claim 1, wherein a distribution of reactive power production takes account of a capacity for reactive power generation by at least one converter of the wind turbines that are switched off.

3. Control method of a wind farm, the wind farm comprising an array of wind turbines, each wind turbine of said array of wind turbines comprising a rotor, a generator, a control unit and means of connection to the wind farm, said wind turbines being endowed with means for generating reactive power following instructions of a control system of the wind farm, said method comprising the step of calculating a global demand for reactive power to be produced by the entire farm on the basis of a voltage at a connection point or a power factor, wherein said method further comprises the following steps:
    receiving one or several thermal parameters from each wind turbine providing information on values of temperatures of electrical components included in each wind turbine;
    calculating, on the basis of the global demand for reactive power and of the values of the thermal parameters received, the instructions for reactive power production for the different wind turbines which reduce the values of the temperatures of the electrical components of those wind turbines displaying greater heating, the instructions for reactive power production collectively satisfying the global demand for reactive power and;
    sending said instructions to each wind turbine;
    obtaining a global reference value for active power reduction for the entire farm;
    calculating, on the basis of the global reference value for active power reduction and of the values of the thermal parameters received, individual instructions for active power limitation for each wind turbine, the active power limitation being greater for those wind turbines displaying greater heating, the individual instructions collectively satisfying the global reference value for active power reduction for the entire farm; and,
    sending said individual instructions to each wind turbine, wherein at least one of the thermal parameters providing information on the values of the temperatures of the electrical components of the wind turbines is a heating index representing the value of the temperature of the electrical component closest to a temperature limit of the electrical component from among the electrical components that are thermally affected by a production of active power, and wherein the active power limitation is greater for those wind turbines that display a greater heating in such a way that minimizes electrical losses in a hottest electrical component of the wind turbines displaying a greater heating index.

4. Control method of a wind farm, according to claim 3, which further comprises the following steps:
- obtaining the reactive power generated by the wind farm at each moment on the basis of the measurements made or data provided by each of the wind turbines making up the wind farm;
- comparing reactive power generated with the global demand for reactive power and,
- adjusting reactive power distribution on the basis of an error existing between the global demand for reactive power and reactive power generated.

5. Control method of a wind farm, according to claim 3, wherein a distribution of reactive power production takes account of a capacity for reactive power generation by at least one converter of the wind turbines that are switched off.

6. Control method of a wind farm, the wind farm comprising an array of wind turbines, each wind turbine of said array of wind turbines containing a rotor, a generator, a control unit and means of connection to the wind farm, said wind turbines being endowed with means for generating reactive power following instructions of a control system of the wind farm, said method comprising the step of calculating a global demand for reactive power to be produced by the entire farm on the basis of a voltage in a connection point or a power factor, wherein said method further comprises the following steps:
- receiving one or several thermal parameters from each wind turbine providing the values of the temperatures of the electrical components included in each wind turbine;
- calculating, on the basis of the global demand for reactive power and of the values of the thermal parameters received, the instructions for reactive power production for the different wind turbines which increase the values of the temperatures of the electrical components of those wind turbines displaying lesser heating, the instructions for reactive power production collectively satisfying the global demand for reactive power and;
- sending said instructions to each wind turbine,
- wherein, depending on the thermal parameters for each wind turbine, the instructions for reactive power production are inductive or capacitive.

7. Control method of a wind farm, according to claim 6, which further comprises the following steps:
- obtaining the reactive power generated by the wind farm at each moment on the basis of the measurements made or data provided by each of the wind turbines making up the wind farm;
- comparing reactive power generated with the global demand for reactive power and,
- adjusting reactive power distribution on the basis of an error existing between the global demand for reactive power and reactive power generated.

8. Control method of a wind farm, according to claim 6, wherein a distribution of reactive power production takes account of a capacity for reactive power generation by at least one converter of the wind turbines that are switched off.

* * * * *